3,012,853
CRYSTALLINE ZEOLITE
Robert M. Milton, Buffalo, N.Y., assignor to Union Carbide Corporation, a corporation of New York
No Drawing. Filed Aug. 26, 1957, Ser. No. 680,382
16 Claims. (Cl. 23—113)

This invention relates to a synthetic crystalline metal alumino-silicate of the zeolite type, and to methods of making this silicate.

It is an object of this invention to provide a zeolite that is suitable for use as an ion-exchanger.

It is another object to provide a crystalline metal alumino-silicate of the zeolite type that may be employed as a molecular sieve adsorbent for small molecules.

To distinguish the subject synthetic zeolite from other zeolitic compositions, both natural and synthetic, the metal alumino-silicate of this invention will be designated hereinafter by the term "zeolite W."

Certain adsorbents, including zeolite W, selectively adsorb molecules on the basis of the size and shape of the adsorbate molecule and are called molecular sieves. Molecular sieves have a sorption area available on the inside of a large number of uniformly sized pores of molecular dimensions. With such an arrangement, molecules of a certain size and shape enter the pores and are adsorbed, while larger or differently-shaped molecules are excluded. Not all adsorbents behave in the manner of molecular sieves. The common adsorbents, charcoal and silica gel, for example, do not exhibit molecular sieve action.

Dehydration to effect the loss of the water of hydration results in a crystal interlaced with channels of molecular dimensions that offer very high surface areas for the adsorption of foreign molecules. Factors influencing occlusion by activated zeolite W crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite W are quite as important as the adsorptive or positive adsorption characteristics. For example, if water and iso-propyl alcohol are to be separated, the process is remarkably effective since the iso-propyl alcohol is refused while the water is adsorbed.

Zeolite W may be represented by the general formula expressed in terms of oxides as follows:

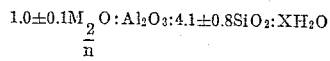

wherein M is at least one monovalent or divalent metal, $n$ is the valence of M, and X in the fully hydrated form is about 5.1.

Zeolite W has been prepared by employing aqueous potassium aluminate and potassium silicate mixtures having compositions within the following ranges expressed as mole ratios of the oxides.

$K_2O/SiO_2$ _____ From 0.6 to 0.9.
$SiO_2/Al_2O_3$ _____ From 4 to 7.
$H_2O/K_2O$ _____ From 20 to 30.

Satisfactory results have been obtained by maintaining the reaction temperature between 75° C. and 100° C. until crystals are formed. However, a reaction temperature of 100° C. is preferred in that it is easy to maintain, and is high enough to promote the reaction and to produce crystallization in a reasonable period of time. At 50° C., an amorphous product was obtained using the same reactant ratios which produced substantially pure zeolite W at the higher temperatures. Reaction temperatures as high as 120° C. yielded a mixed product of zeolite W and other zeolites.

As a specific example of the invention, a potassium aluminate solution was prepared by mixing 60 grams of potassium hydroxide, 50 grams of hydrated alumina containing 0.64 mole of $Al_2O_3$ per 100 grams, and 50 milliliters of water, and heating the mixture until the solids dissolved. The solution was then cooled to room temperature, and added to 495 grams of a potassium silicate solution containing 7.8 weight percent of potassium oxide and 19.3 weight percent of silicon dioxide. The resulting mixture was stirred until homogeneous. The resulting reaction mixture had the molar composition of:

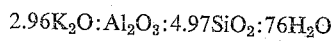

Crystallization was carried out by heating in a sealed glass jar at 100° C. for 91 hours. The crystalline product which formed had settled to the bottom of the jar and the liquor was clear. The product was filtered, washed to a pH of 10.5 and dried. This product had the molar composition of:

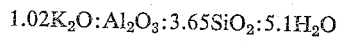

The crystalline product had the X-ray diffraction pattern shown in Table I. This X-ray diffraction pattern is characteristic of zeolite W.

TABLE I
*X-ray diffraction pattern for zeolite W*

| Bragg Angle | Relative Intensity, 100 I/I₀ | Interplanar Spacing e (A.) | | Miller Indices, hkl |
|---|---|---|---|---|
| | | Observed | Calculated | |
| 8.85 | 20 | 9.98 | 10.03 | 200 |
| 10.8 | 49 | 8.18 | 8.19 | 211 |
| 12.5 | 54 | 7.08 | 7.09 | 220 |
| 16.6 | 28 | 5.34 | 5.36 | 321 |
| 17.7 | 56 | 5.01 | 5.01 | 400 |
| 19.9 | 21 | 4.46 | 4.48 | 420 |
| 20.7 | 35 | 4.29 | 4.28 | 332 |
| 24.4 | 20 | 3.64 | 3.66 | 521 |
| 27.4 | 100 | 3.25 | 3.25 | 611 |
| 28.1 | 75 | 3.17 | 3.17 | 620 |
| 30.2 | 71 | 2.96 | 2.96 | 631 |
| 32.8 | 53 | 2.73 | 2.73 | 721 |
| 33.6 | 12 | 2.66 | 2.68 | 642 |
| 35.2 | 26 | 2.55 | 2.55 | 732 |
| 41.4 | 10 | 2.18 | 2.19 | 842 |
| 51.4 | 12 | 1.78 | 1.77 | 880 |
| 53.1 | 15 | 1.72 | 1.72 | 10,6,0 |

Zeolite W has a cubic unit cell, an edge of which is about 20.055 A.

Zeolite W has also been prepared from an aqueous sodium aluminate-potassium silicate mixture as shown in the following example.

A sodium aluminate solution was prepared by dissolving 6.6 grams of sodium aluminate containing 40.7 weight percent $Na_2O$ and 59.3 weight percent $Al_2O_3$ in 15 grams of water with 5 grams of sodium hydroxide. This solution was added to 50 grams of potassium silicate solution containing 78.4 weight percent $K_2O$ and 19.36 weight percent $SiO_2$ with stirring until a homogeneous mixture was obtained. The reaction mixture had the following molar composition:

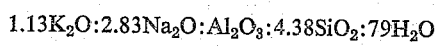

Crystallization was carried out by heating in a sealed glass jar in a steam bath at 100° C. for 87½ hours. The crystalline product which formed had settled to the bottom of the jar and the liquor was clear. The product was recovered by filtration and washing. Its analysis corresponded to the following formula:

$$0.91K_2O:0.21Na_2O:Al_2O_3:3.58SiO_2:5.1H_2O$$

The crystal structure was confirmed as being that of zeolite W by X-ray diffraction examination.

Although it is not known to what extent one could employ sodium in place of potassium in the reactant mixture, the above example shows that at least 72 mole percent substitution can be done.

For satisfactory use as an adsorbent, zeolite W must be at least partially dehydrated (activated). Such activation can be carried out by heating the zeolite to an elevated temperature under atmospheric pressure, by maintaining the zeolite at room temperature under vacuum, or by heating the zeolite to an elevated temperature under reduced pressure.

Zeolite W which had been activated by heating at 250° C. at slightly reduced pressure had the adsorption data shown in Table II.

TABLE II

*Zeolite W adsorption data*

| Adsorbate | Adsorption Temperature, ° C. | Adsorption Pressure, mm. Hg | Weight Percent Adsorbed |
|---|---|---|---|
| $H_2O$ | 25 | 0.003 | 3.4 |
|  | 25 | 0.011 | 5.8 |
|  | 25 | 0.085 | 11.6 |
|  | 25 | 4.5 | 14.4 |
|  | 25 | 29 | 21.7 |
| $NH_3$ | 25 | 0.06 | 0.9 |
|  | 25 | 3.0 | 2.6 |
|  | 25 | 6.0 | 3.5 |
|  | 25 | 292 | 10.5 |
| $CO_2$ | 25 | 4 | 1.1 |
|  | 25 | 90 | 3.3 |
|  | 25 | 700 | 5.7 |
| $SO_2$ | 25 | 0.016 | 2.0 |
|  | 25 | 0.70 | 3.5 |
|  | 25 | 12 | 4.3 |
|  | 25 | 98 | 4.9 |
|  | 25 | 696 | 5.3 |
| $CH_3OH$ | 25 | 0.088 | 1.7 |
|  | 25 | 0.26 | 3.7 |
|  | 25 | 0.73 | 4.5 |
|  | 25 | 5.2 | 5.2 |
|  | 25 | 30.0 | 5.6 |
|  | 25 | 110 | 8.7 |
| $H_2S$ | 25 | 11.0 | 1.5 |
|  | 25 | 98 | 2.7 |
|  | 25 | 198 | 3.5 |
| $O_2$ | 25 | 400 | 4.0 |
|  | −196 | 130 | 2.7 |

Nitrogen at −196° C., n-pentane at 25° C. and carbon monoxide at −78° C. were not substantially adsorbed by zeolite W.

Thus it may be seen that zeolite W may be employed to effect the separation of mixtures such as nitrogen and oxygen at −196° C. by selectively adsorbing one component of the mixture, e.g., oxygen, and excluding the other, e.g. nitrogen. Other fluid mixtures may be similarly separated.

Another use for zeolite W may be found in the purification of hydrogen sulfide-contaminated petroleum hydrocarbons. Hydrogen sulfide is adsorbed by zeolite W whereas the petroleum hydrocarbons are refused.

Potassium zeolite W can be cation-exchanged with monovalent and divalent cations such as lithium, sodium, calcium, manganese, magnesium, zinc and strontium ions.

Ion exchange can be effected by treating the zeolite with a salt solution of the exchanging solution. There is no need for activation of the zeolite prior to ion-exchange treatment. The adsorption properties of some of the ion-exchanged forms after activation under reduced pressure at temperatures of at least 150° C. are shown in Table III.

TABLE III

*Cation-exchanged zeolite W adsorption data*

| Cation | Li | Na | Ca | Mg | Zn | Sr |
|---|---|---|---|---|---|---|
| Percent Exchange | 22.6 | 69 | 52 | 52.9 | 89 | 62.7 |

| Adsorbate | Temp., ° C. | Pressure, mm. Hg | Weight percent adsorbate taken up | | | | | |
|---|---|---|---|---|---|---|---|---|
| | | | Li | Na | Ca | Mg | Zn | Sr |
| $H_2O$ | 25 | 24 | 16.9 | 20.5 | 17.6 | 19.0 | 16.9 | 16.6 |
| $CO_2$ | 25 | 700 | 3.5 | 4.7 | 3.5 | 6.8 | 2.9 | 5.5 |
| $C_2H_6$ | 25 | 700 | 0.8 | 2.1 | 1.2 | 0.5 | 0.4 | 0.9 |
| $N_2$ | −196 | 700 | 1.4 | 2.3 | 2.6 | 0.9 | 2.6 | 2.9 |
| A | −196 | 140 | 2.0 | 1.4 | 3.9 | 0.7 | 3.6 | 3.7 |
| $O_2$ | −196 | 140 | 2.0 | 2.3 | 3.5 | 1.5 | 3.5 | 3.9 |
| $NH_3$ | 25 | 700 | | | | 11.5 | 10.0 | 11.6 |
| $SO_2$ | 25 | 700 | | | | 5.3 | 3.7 | 5.0 |

Occasionally the cation exchange will cause a slight change in the X-ray diffraction pattern, but the original crystal structure remains substantially unchanged.

What is claimed is:

1. A method for preparing a potassium zeolite having a composition expressed in terms of oxides as follows:

$$1.0 \pm 0.1K_2O : Al_2O_3 : 4.1 \pm 0.8 SiO_2 : XH_2O$$

wherein X in the fully hydrated form is about 5.1, and having atoms arranged in a unit cell in such a manner that the X-ray powder diffraction pattern of the zeolite is essentially the same as that shown in Table I, which comprises preparing a potassium-aluminate-silicate water mixture whose composition, expressed in terms of oxides mole ratios is:

$K_2O/SiO_2$ _____ From 0.6 to 0.9.
$SiO_2/Al_2O_3$ _____ From 4 to 7.
$H_2O/K_2O$ _____ From 20 to 30.

maintaining the temperature within the range from about 75° C. to about 100° C. until crystals as previously defined are formed; and separating the resulting potassium-alumino-silicate crystals from the mother liquor.

2. A method for preparing a potassium zeolite having a composition expressed in terms of oxides as follows:

$$1.0 \pm 0.1K_2O : Al_2O_3 : 4.1 \pm 0.8 SiO_2 : XH_2O$$

wherein X in the fully hydrated form is about 5.1, and having atoms arranged in a unit cell in such a manner that the X-ray powder diffraction pattern of the zeolite is essentially the same as that shown in Table I, which comprises preparing a potassium-aluminate-silicate water mixture whose composition, expressed in terms of oxide mole ratios is:

$K_2O/SiO_2$ _____ From 0.6 to 0.9.
$SiO_2/Al_2O_3$ _____ From 4 to 7.
$H_2O/K_2O$ _____ From 20 to 30.

maintaining the temperature within the range from about 75° C. to 120° C. until crystals as previously defined are formed; and separating the crystals from the mother liquor.

3. A method for preparing a potassium zeolite having a composition expressed in terms of oxides as follows:

$$1.0 \pm 0.1K_2O : Al_2O_3 : 4.1 \pm 0.8 SiO_2 : XH_2O$$

wherein X in the fully hydrated form is about 5.1, and having atoms arranged in a unit cell in such a manner that the X-ray powder diffraction pattern of the zeolite is essentially the same as that shown in Table I, which comprises preparing a potassium-aluminate-silicate water mixture whose composition, expressed in terms of oxide mole ratios is:

$K_2O/SiO_2$ _____ From 0.6 to 0.9.
$SiO_2/Al_2O_3$ _____ From 4 to 7.
$H_2O/K_2O$ _____ From 20 to 30.

maintaining the temperature and about 100° C. until crystals as previously defined are formed; and separating the crystals from the mother liquor.

4. A synthetic, crystalline zeolite wherein the composition expressed in terms of oxides is substantially as follows:

$$1.0\pm0.1 M_{\frac{2}{n}}O : Al_2O_3 : 4.1\pm0.8 SiO_2 : XH_2O$$

wherein M is at least one metal having a valence up to about 2, $n$ is the valence of the metal and X in the fully hydrated form is about 5.1; and wherein the atoms are arranged in a unit cell in such a manner that the X-ray powder diffraction pattern of said zeolite is essentially the same as that shown in Table I.

5. A synthetic, crystalline zeolite wherein the composition expressed in terms of oxides is substantially as follows:

$$1.0\pm0.1 M_{\frac{2}{n}}O : Al_2O_3 : 4.1\pm0.8 SiO_2 : XH_2O$$

wherein M is at least one metal selected from the group consisting of lithium, sodium, potassium, calcium, manganese, magnesium, zinc and strontium, $n$ is the valence of the metal and X in the fully hydrated form is about 5.1; and wherein the atoms are arranged in a unit cell in such a manner that the X-ray powder diffraction pattern of said zeolite is essentially the same as that shown in Table I.

6. A synthetic, crystalline zeolite wherein the composition expressed in terms of oxides is substantially as follows:

$$1.0\pm1 K_2O : Al_2O_3 : 4.1\pm0.8 SiO_2 : XH_2O$$

wherein X in the fully hydrated form is about 5.1; and wherein the atoms are arranged in a unit cell in such a manner that the X-ray powder diffraction pattern of said zeolite is essentially the same as that shown in Table I.

7. A method for preparing a potassium-sodium zeolite having a composition expressed in terms of oxides as follows:

$$0.91 K_2O : 0.21 Na_2O : Al_2O_3 : 3.58 SiO_2 : XH_2O$$

wherein X in the fully hydrated form is about 5.1, and having atoms arranged in a unit cell in such a manner that the X-ray powder diffraction pattern of the zeolite is essentially the same as that shown in Table I, which comprises preparing a sodium aluminate-potassium silicate water mixture whose composition, expressed in terms of oxide mole ratios is:

$$\frac{Na_2O+K_2O}{SiO_2} \text{ equal to about } 0.9$$

$$\frac{SiO_2}{Al_2O_3} \text{ equal to about } 4.4$$

$$\frac{H_2O}{Na_2O+K_2O} \text{ equal to about } 20$$

$$\frac{K_2O}{Na_2O+K_2O} \text{ equal to about } 0.29$$

maintaining the temperature within the range from about 75° C. to 100° C. until crystals as previously defined are formed; and separating the crystals from the mother liquor.

8. A method for preparing a potassium-sodium zeolite having a composition expressed in terms of oxides as follows:

$$0.91 K_2O : 0.21 Na_2O : Al_2O_3 : 3.58 SiO_2 : XH_2O$$

wherein X in the fully hydrated form is about 5.1, and having atoms arranged in a unit cell in such a manner that the X-ray powder diffraction pattern of the zeolite is essentially the same as that shown in Table I, which comprises preparing a sodium aluminate-potassium silicate water mixture whose composition, expressed in terms of oxide mole ratios is:

$$\frac{Na_2O+K_2O}{SiO_2} \text{ equal to about } 0.9$$

$$\frac{SiO_2}{Al_2O_3} \text{ equal to about } 4.4$$

$$\frac{H_2O}{Na_2O+K_2O} \text{ equal to about } 20$$

$$\frac{K_2O}{Na_2O+K_2O} \text{ equal to about } 0.29$$

maintaining the temperature at about 100° C. and crystals as previously defined are formed; and separating the crystals from the mother liquor.

9. A method for preparing a potassium-sodium zeolite having a composition expressed in terms of oxides as follows:

$$1.0\pm0.1 M_2O : Al_2O_3 : 4.1\pm0.8 SiO_2 : XH_2O$$

wherein M is a mixture of potassium and sodium cations and X in the fully hydrated form is about 5.1, and having atoms arranged in a unit cell in such a manner that the X-ray powder diffraction pattern of the zeolite is essentially the same as that shown in Table I, which comprises preparing a sodium-aluminate-potassium-silicate-water mixture whose composition, expressed in terms of oxide mole ratios is:

$$\frac{Na_2O+K_2O}{SiO_2} \text{ from about } 0.6 \text{ to } 0.9$$

$$\frac{SiO_2}{Al_2O_3} \text{ from about } 4 \text{ to } 7$$

$$\frac{H_2O}{Na_2O+K_2O} \text{ from about } 20 \text{ to } 30$$

$$\frac{K_2O}{Na_2O+K_2O} \text{ not less than about } 0.28$$

maintaining the temperature at from about 75° C. to 100° C. until crystals as previously described are formed; and separating the crystals from the mother liquor.

10. A dehydrated synthetic crystalline zeolite having a composition expressed in terms of oxides substantially as follows:

$$1.00\pm0.1 M_{\frac{2}{n}}O : Al_2O_3 : 4.1\pm0.8 SiO_2$$

wherein M is at least one metal having a valence up to about 2, $n$ is the valence of the metal, and wherein the atoms are arranged in a unit cell in such a manner that the X-ray powder diffraction pattern of said zeolite is essentially the same as that shown in Table I.

11. A dehydrated synthetic crystalline zeolite in accordance with claim 10 wherein the metal is potassium.

12. A dehydrated synthetic crystalline zeolite having a composition expressed in terms of oxides substantially as follows:

$$0.91 K_2O : 0.21 Na_2O : Al_2O_3 : 3.58 SiO_2$$

wherein the atoms are arranged in a unit cell in such a manner that the X-ray powder diffraction pattern of said zeolite is essentially the same as that shown in Table I.

13. A synthetic crystalline zeolite having a composition expressed in terms of oxides substantially as follows:

$$0.91 K_2O : 0.21 Na_2O : Al_2O_3 : 3.58 SiO_2 : XH_2O$$

wherein X in the fully hydrated form is about 5.1, and wherein the atoms are arranged in a unit cell in such a manner that the X-ray powder diffraction pattern of said zeolite is essentially the same as that shown in Table I.

14. A method as described in claim 1 wherein the separated crystals are further heated to produced the dehydrated form of said zeolite.

15. A method as described in claim 3 wherein the separated crystals are further heated to produce the dehydrated form of said zeolite.

16. A method as described in claim 9 wherein the separated crystals are further heated to produce the dehydrated form of said zeolite.

References Cited in the file of this patent

UNITED STATES PATENTS

| | | |
|---|---|---|
| 2,413,134 | Barrer | Dec. 24, 1946 |

FOREIGN PATENTS

| | | |
|---|---|---|
| 174,097 | Germany | Jan. 12, 1905 |
| 451,733 | Great Britain | Aug. 11, 1936 |

OTHER REFERENCES

Barrer et al.: "J. Chem. Soc.," Part 3, 2882–2891 (1956).

Barrer et al.: "J. Chem. Soc.," 1267–1278 (1951).

Barrer et al.: Ibid., 1561–1571 (1952).

Mellor: Comprehensive Treatise on Inorganic and Theoretical Chemistry, vol. 6, pages 567–568, Longmans, Green and Co., N.Y., 1925.